April 30, 1935.　　　L. KUNST　　　1,999,701
OIL FILLED ELECTRIC CABLE
Filed Feb. 26, 1931
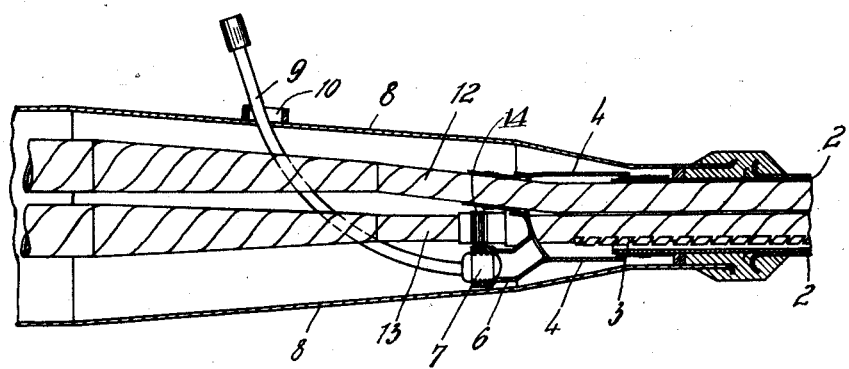
Inventor
Ludwig Kunst
by Knight Bros
attorneys Patented Apr. 30, 1935

1,999,701

UNITED STATES PATENT OFFICE 1,999,701

OIL FILLED ELECTRIC CABLE

Ludwig Kunst, Berlin-Charlottenburg, Germany, assignor to Siemens-Schuckertwerke Aktiengesellschaft, Berlin-Siemensstadt, Germany, a corporation of Germany Application February 26, 1931, Serial No. 518,463 In Germany March 7, 1930

6 Claims. (Cl. 173—268)

This invention relates to oil-filled electric cables and has for its object a means of connecting cables of this type in such manner as to prevent the escape of oil from the spaces between the individual cores or from the drainage pipes located in the strands. For this purpose according to the present invention at each of the cable ends to be connected a closing cap is pushed over the lead sheath common to all the cores of the cable to effect a seal, said closing cap being provided with tubular attachments which form individual outlets for the cable cores, and further with a closable oil passage opening. So long as this opening is closed, the entire cap tightly seals the cable end with respect to oil leakages, both in relation to the lead sheath as also in relation to the individual cores passed through the tubular attachments. With this cap seal present the connection of the cores with those of the adjoining cable is effected. After this has been done the parts of the joint enclosing casing are connected to the cable sheath and to each other and then the aforementioned oil passage opening provided in the cap and heretofore closed by a stopper is opened, so that the oil can now flow through the joint casing from one cable section into the other. In order to facilitate the opening of the oil passage opening it is desirable to provide the closing screw or stopper with a flexible stem, which is passed outwardly through an opening provided in the joint casing before the parts of the casing are connected together and with the aid of which the closing stopper or screw can then be withdrawn from or screwed out of the oil passage opening. This method renders it possible to effect the connection of the cable cores and of the casing with the cable sheath without loss of oil and without any hindrance to work being caused by the escape of oil. After the stopper is removed and before the cable is put into service, the opening 10 in the joint casing will, of course, be suitably closed.

If it be desired to prevent the circulation of oil from one cable section to another cable section, that is to say to use the joint casing and associated parts as a stop joint between two cable sections, the oil passage opening in the closing cap is omitted. In order that the said invention may be clearly understood and readily carried into effect, the same will now be described more fully with reference to the accompanying drawing which illustrates a cable junction provided with a connecting device according to the present invention.

2 is the cable sheath of a multicore cable of which only two cores, namely 12 and 13, are shown in the drawing. 3 is a drainage pipe located in the spaces between two cores. To enable the end of the cable to be connected with the end of another cable without oil escaping from the spaces or drainage pipe, there is arranged over the cable sheath a closing cap 4 of which in the drawing only the tube shaped attachments, serving for the passage of the cores 12 and 13, are to be seen. The tube shaped attachments form a part of the cap 4 which is preferably soldered to the common lead sheath. The individual cable cores extend through said attachments, as shown with respect to the core 13, and 14 indicates an oil tight seal therefor. 6 indicates an oil passage opening into the closing cap and the joint casing which opening can be closed by means of a stopper 7. 8 indicates the joint casing which is connected with the lead sheath at each end by means of solder. In order to enable stopper 7 to be removed after the casing is soldered in place, it is attached to a flexible stem 9 which is brought out through a suitable hole 10 provided in the joint casing.

What I do claim as my invention and desire to secure by Letters Patent is:—

1. A joint for oil filled cables, including a joint casing, a cap sealed oil tight to the common sheath of the cable, and having a tubular extension for each cable core, forming an outlet for said core and being sealed oil tight to it, and an oil passage orifice in said cap, having a plug normally closed to prevent oil discharge from the cable, and a flexible shaft attached to said plug and extending to the outside of said joint casing, for removing the plug from said orifice after the cable joint is completed.

2. An electric cable having an insulated conductor, an enclosing sheath and a fluid containing channel located between the insulation and the sheath, in combination with a means, one end of which engages a wall of the sheath, and the other end the covering on the conductor to define a fluid containing chamber, a controllable port for the means through which fluid may flow when said port is open, and a fluid tight casing which encloses the means and is jointed to a sheath at one end.

3. An electric cable having an insulated conductor, an enclosing sheath and a fluid containing channel located between the insulation and the sheath, in combination with a means one portion of which engages a wall of the sheath and another portion closely surrounding the covering on the conductor to define between them a fluid containing chamber, a port in the wall of the means through which fluid may flow from and to said chamber when the port is open, and an outer casing surrounding the means and spaced therefrom, said casing being sealed to the sheath.

4. A joint for a fluid filled multi-conductor sheathed cable comprising a joint casing secured at its ends to the sheaths of the cable, caps located at opposite ends of the casing, each having a cylindrical portion secured fluid tight to a sheath and a thin wall tubular sleeve projecting from said portion toward the center of the casing and through which a conductor extends, each sleeve effecting a fluid tight seal between it and the conductor covering.

5. In combination a fluid filled sheathed cable, an enclosure secured fluid tight to an end of the sheath and provided with a small opening in spaced relation to the cable end, a means located within the enclosure which is sealed to the sheath and to the covering of the cable conductor to prevent the free flow of fluid from the cable into the enclosure, said means having a fluid passage opening from the cable into the enclosure, a device controlling said opening, and a flexible means connected to the device and extending outwardly through the opening in the enclosure to the outside thereof for manipulating the device.

6. A joint for a fluid-filled multi-core cable having a sheath common thereto comprising a casing sealed to the cable sheath, a cap within the casing common to the cores, one end of which engages a wall of the sheath and is sealed thereto, individual tubular sleeves on the opposite end of the cap through which the cores extend independently into the casing, each of said sleeves being independently sealed to the core enclosed thereby to prevent leakage of fluid, said cap having an orifice independent of the extensions through which fluid may flow between the joint casing and the interior of the sheath, a device for closing the orifice, and means permitting the removal of the device to establish free exchange of fluid between the interior of the sheath and the casing.

LUDWIG KUNST.